United States Patent [19]

Campion

[11] Patent Number: 5,323,983
[45] Date of Patent: Jun. 28, 1994

[54] CASSETTEE REWINDING APPARATUS

[76] Inventor: Mario Campion, 29 de l'Aqueduc #6, Varennes, Quebec, Canada

[21] Appl. No.: 974,166

[22] Filed: Nov. 10, 1992

[51] Int. Cl.⁵ .................. B65H 18/10; B65H 20/00; G11B 15/42

[52] U.S. Cl. .................. 242/179; 242/54 R; 242/96

[58] Field of Search .......... 242/179, 200, 201, 54 R, 242/107, 100.1, 100.2, 96

[56] References Cited

U.S. PATENT DOCUMENTS

| 408,749 | 8/1889 | Robinson | 242/107 |
|---|---|---|---|
| 2,534,083 | 12/1950 | Van Den Broek | 242/201 |
| 3,963,190 | 6/1976 | Wilson | 242/55.53 |
| 3,999,725 | 12/1976 | Arbib | 242/179 |
| 4,131,922 | 12/1978 | Yoshida et al. | 242/200 |
| 4,142,693 | 3/1979 | Czerwinski | 242/107 |
| 4,310,131 | 1/1982 | Althuber et al. | 242/204 |
| 4,445,651 | 5/1984 | Kimizuka et al. | 242/199 |
| 4,836,465 | 6/1989 | May et al. | 242/200 |
| 4,974,790 | 12/1990 | Myers | 242/199 |

Primary Examiner—Daniel P. Stodola
Assistant Examiner—John Q. Nguyen

[57] ABSTRACT

A manual cassette rewinding apparatus for allowing the user to rewind a cassette using an ergonomical pulling action on a string. The rewinding apparatus has a pulley rotatably mounted inside a housing. A string is winded around the pulley. A driving pin linked to the pulley is adapted to rotate jointly with the latter only when the string is being unwinded from the pulley. A spring is used to rewind the string around the pulley. The driving pin is adapted to be inserted into the hub of a cassette and the sting to be alternatively pulled and allowed to rewind by the user. When the string is pulled it rotates the driving pin thus rewinding the cassette.

6 Claims, 3 Drawing Sheets

CASSETTEE REWINDING APPARATUS

The present invention relates to the field of rewinding accessories and more particularly to a device adapted to manually rewind audio cassettes.

FIELD OF THE INVENTION

Portable cassette players have become increasingly popular over the last decade. Most of these portable cassette players are powered by auxiliary batteries having a limited life span.

With conventional portable cassette players, once a given side of a given cassette has been played, if the user desires to play the same side immediately, he must resort to rewinding the tape by using the cassette rewind option which uses up valuable battery energy.

In order to circumvent the above mentioned problem, the present invention proposes a device which is adapted to manually rewind the cassette.

A search amongst prior patents has revealed two prior patents, namely U.S. Pat. No. 3,999,725 and U.S. Pat. No. 4,390,146.

However, the device described in the above mentioned patents use a short handle which must be rotated by the user. The rotating action has proven to be tedious and unergonomical. Furthermore, the device proposed in the above mentioned patents is mechanically complex and thus subject to failure.

The present invention proposes a device which is mechanically simple and which only requires that the user pull on a string to rewind the cassette.

SUMMARY OF THE INVENTION

The present invention thus relates to an apparatus for manually rewinding a cassette. The apparatus has a pulley rotatably mounted inside a housing, a string adapted to be rewinded around the pulley, a ratchet means adapted to rotate jointly with the pulley when the string is being unwinded and to be still when the string is being winded around the pulley. The apparatus also has a driving pin adapted to rotate jointly with the ratchet means and to be inserted in a cassette hub. It also has a resilient biasing means for winding the string around the pulley. In use, the pin is adapted to be inserted into the hub of a cassette and the string to be pulled by a user. When the string is pulled, it unwinds from the pulley rotating the pulley. Rotating the pulley, the ratchet means and the driving pin thus rewinding the cassette.

The resilient means is preferably a coil spring attached at one of its ends to the housing and at its other end to the pulley. The spring is adapted to be tensioned when the string is being unwinded and to bring the pulley back to its original position.

The ratchet means preferably comprises a ratchet disc having a set of teeth adapted to selectively abut against the corresponding set of substantially fan-shaped teeth provided on the pulley and a set of substantially fan-shaped teeth of the housing.

The apparatus further comprises a driven pin adapted to be inserted in a second hub of the cassette and breaking means for restraining the rotation of the driven pin. The driven pin will thus keep the pin in tension during the rewinding operation. In the preferred embodiment, the breaking means is a block adapted to abut on the driven pin.

DETAILED DESCRIPTION OF THE PREFERRED EMBODIMENT

Figure 1:
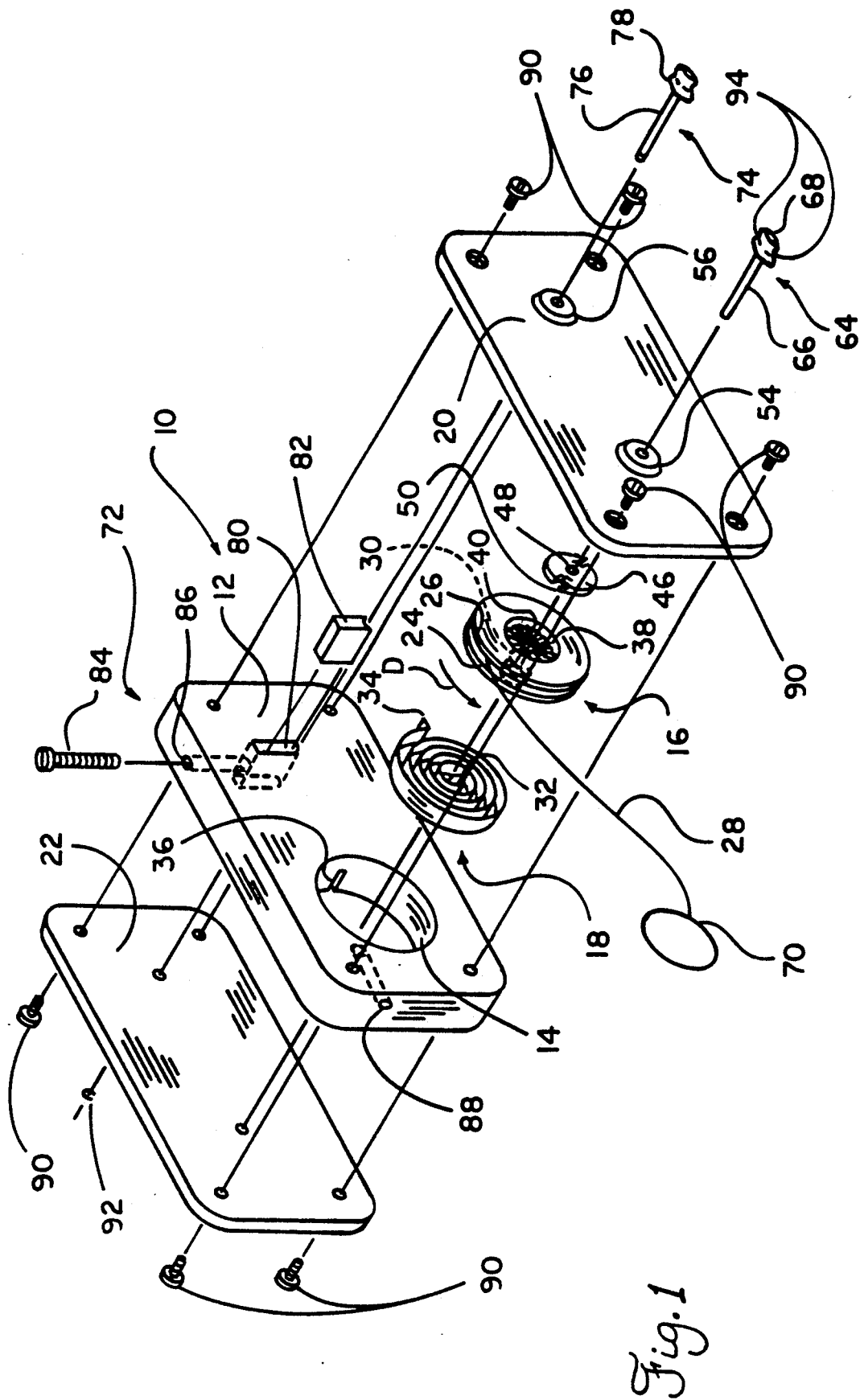
FIG. 1 is an exploded view of a winding apparatus embodying the invention.
Figure 2:
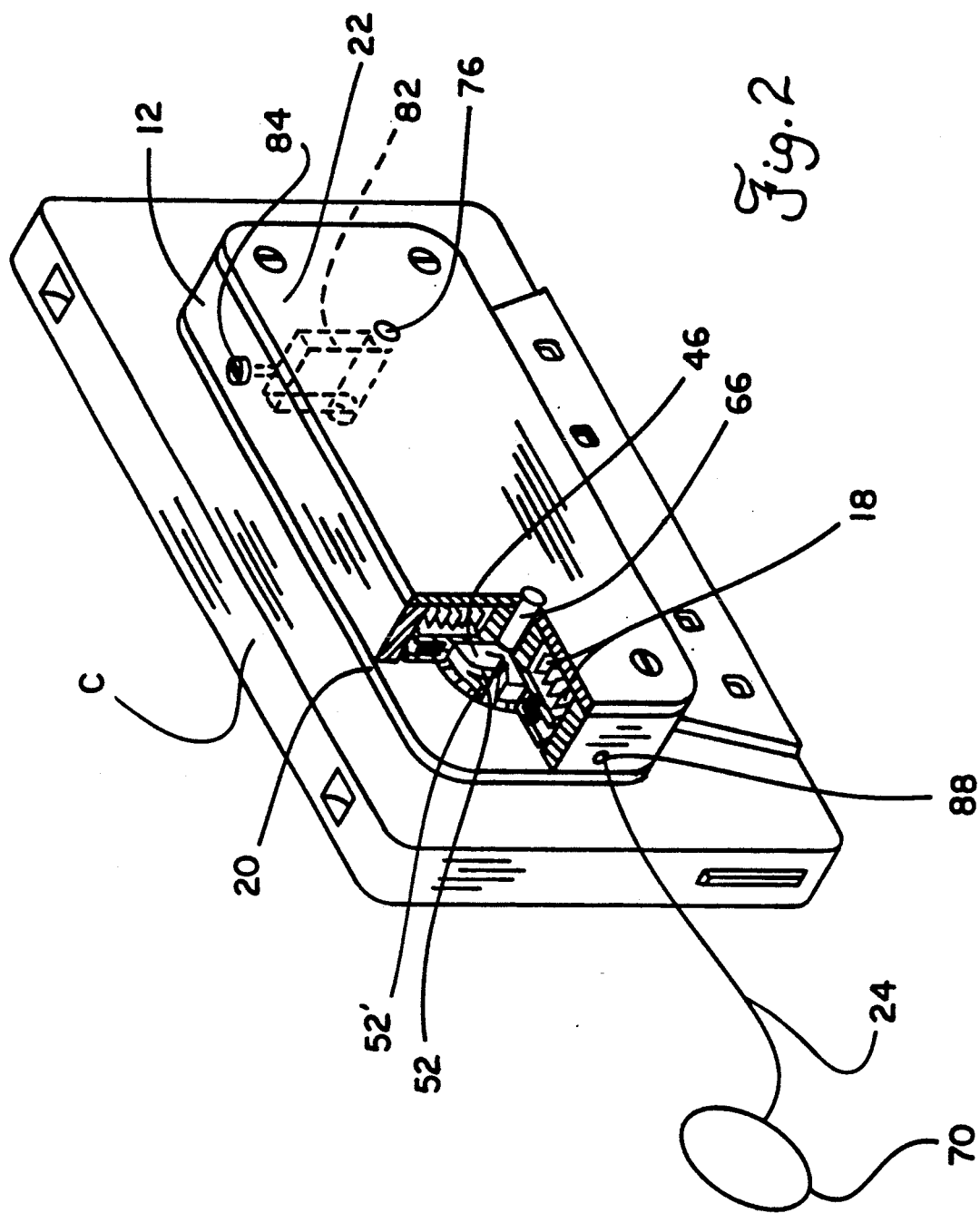
FIG. 2 is a partially exploded view of a winding apparatus mounted on a cassette.

Referring to FIG. 1, there is shown a winding apparatus 10. The apparatus 10 has a main body 12. The main body 12 has a substantially cylindrical aperture 14 adapted to house a winding pulley 16 and a resilient biasing means such as a coil spring 18. A pair of plates 20 and 22 are adapted to be fixed to each side of the main body 12 to prevent axial displacement of the pulley 16 and the spring 18. The winding pulley 16 has a pair of flanges 24 and 26. A winding string 28 is adapted to be winded around the winding pulley 16. The flange 24 of the winding pulley 16 extends integrally into a hub 30.

A first end 32 of the coil spring 18 is adapted to be fixed to the hub 30 while a second end 34 of the coil spring 18 is adapted to be abuttingly fixed to a fixing prong 36 extending inwardly and radially from the aperture 14.

The flange 26 of the pulley 16 extends integrally into a recess 38. The back wall of the recess 38 is provided with an array of substantially fan-shaped teeth 40.

Figure 3:
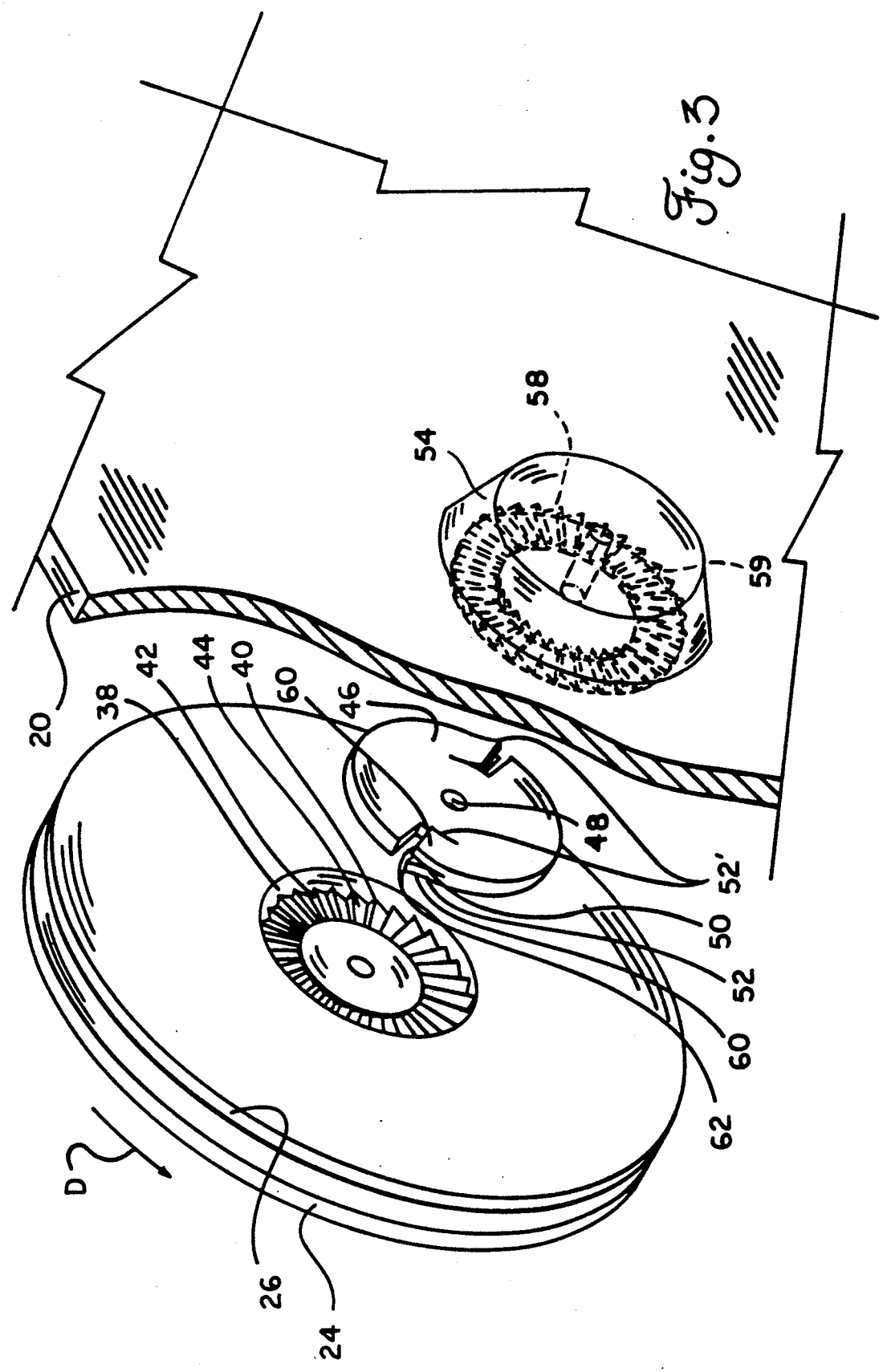
FIG. 3 is a close-up detailed view of the ratchet mechanism.

As illustrated more specifically in FIG. 3, each one of the teeth 40 has a substantially axial edge 42 and an oblique edge 44. The recess 38 is adapted to house a ratchet disk 46. The ratchet disk 46 has a central aperture 48 and a pair of diametrically opposed peripheral splitted tongues 50. Each one of the splitted tongues 50 has a pair of resilient teeth 52 and 52' which project axially outwardly from each face of the disk 46. The plate 20 is formed integrally with a pair of recesses 54 and 56. The inner back surface of the recess 54 provided with an array of fan-shaped teeth 58 similar to the teeth 40 found on the back wall of the recess 38.

Each one of the resilient teeth 52 of the splitted tongue 50 is adapted to engage a corresponding array of teeth 40 while each one of the teeth 52' is adapted to engage a corresponding array of teeth 58. Each one of the teeth 52 and 52' has a substantially oblique surface 60 and a substantially axial surface 62.

When the pulley 16 is rotated in the direction indicated by the arrow D in FIGS. 1 and 3, the axial edge 42 of the teeth 40 abuts against a corresponding pair of substantially axial surface 62 of one of the teeth 52 thus pushing the ratchet disk 46.

Meanwhile, the substantially oblique surface 60 of one of the teeth 52' abuts against the teeth 58 in the cavity 54. Since the teeth 52' are relatively resilient, they are adapted to bend inwardly. The ratchet disk 46 is thus adapted to be driven by the pulley 16 and to rotate freely inside the cavity 54 when it is rotated in accordance with arrow D.

When the pulley 16 rotates in the direction opposite that indicated by arrow D in FIGS. 1 and 3, the ratchet disk 46 is prevented from rotating jointly with the pulley 16 by the axial surfaces 62 of the two teeth 52' which abut against the axial edges 59 of a corresponding pair of teeth 58 in the cavity 54 thus braking the disk 46. Again, since the teeth 52 are also resilient, their bending action allows the pulley 16 to rotate relatively to the disk 46.

The ratchet disk 46 thus acts as a ratchet type of mechanism and is adapted to rotate jointly with the pulley 16 only when the latter is rotated in the direction indicated by the arrow D in FIG. 1.

A driving pin 64 having a driving pin shaft 66 and a driving head 68 is jointly attached to the disk 46.

In use, the user first positions a cassette, indicated by the letter "C", to be rewinded on the cassette rewinding apparatus 10 with the driving pin 64 inserted in the aperture of one of the cassette hubs having inwardly projecting teeth. The user then inserts one of his fingers inside a loop 70 which is attached to the string 28. The user then pulls on the loop 70, thus unwinding the string 28 from the pulley 16 and rotating the latter in the direction indicated by the letter D. As stated earlier, the ratchet disk 46 and the driving pin head 68 to which it is attached will rotate jointly with the pulley 16.

Since the end 32 of the coil spring 18 is attached to the hub 30, the spring 18 is put in tension by the unwinding of the string 28. Therefore, once the string is fully unwound from the pulley 16, the spring 18 is put in maximal tension. The user then merely needs to allow the string 28 to become slack and the spring 18 will rotate the pulley 16 back to its original position while winding the string 28 around the pulley 16.

Again, as stated earlier, when the pulley 16 is rotating in the direction opposite the direction indicated by letter D, the ratchet disk 46 is prevented from rotating jointly with pulley 16 and the driving head 64 is thus kept still.

To fully rewind a cassette, the user must repeat the pulling cycle a given number of times which depends on variables such as the length of the string 28, the diameter of the pulley 16 and the length of the cassette ribbon.

In order to insure that the cassette ribbon is in constant tension during the winding operation, to minimize the risk of the ribbon tangling up, a tensioning means is provided in the form of a brake mechanism 72 applied to a driven pin 74 having a driven pin shaft 76 and a driven pin head 78. The drive pin head 78 is adapted to be inserted inside the aperture of the other cassette hub. The driven pin shaft 76 extends through an aperture 80 provided in the main body 12. The aperture 80 also houses a friction block 82 adapted to frictionally abut against the shaft 76. An adjustment screw 84 extends through a threaded aperture 86 leading to the aperture 80. The adjustment screw 84 is adapted to press down on the block 82 to frictionally partially restrain the rotation of the driven pin 74.

Both pin heads 68 and 78 are provided with a pair of slots 94 to resiliently snap the hub mechanisms of the cassette.

The main body 12 is provided with a side aperture 88 adapted to guide the string 28. The plates 20 and 22 are fixed to the main body 12 by a set of screws 90. A retaining washer 92 restricts axial movement of the driven pin 74.

I claim:

1. An apparatus for manually rewinding a tape wound around at least one hub in cassette, said apparatus comprising:
   a pulley rotatably mounted inside a housing,
   a string adapted to be wound around said pulley,
   a winding key adapted to be inserted in said cassette hub,
   a ratchet means rotating jointly with said winding key for selectively allowing and preventing rotation of said pulley relative to said winding key, said ratchet means being adapted to rotate jointly with said pulley when said string is being unwound and to be still when said string is being wound around said pulley,
   a resilient biasing means for winding said string around said pulley, whereby, in use, said winding key is adapted to be inserted into said hub of said cassette and said string to be pulled by a user, when said sting is pulled, it unwinds from said pulley, rotating said pulley, said ratchet means and said winding key, thus rewinding said cassette.

2. An apparatus for manually rewinding a cassette as recited in claim 1 wherein said resilient biasing means is a coil spring attached at one of its end to said housing and at its other end to said pulley, said spring being adapted to be tensioned when said string is being unwound to bring said pulley back to a position it was in prior to said string being pulled.

3. An apparatus for manually rewinding a cassette as recited in claim 1, wherein said ratchet means comprises a ratchet disc having a set of teeth adapted to selectively abut against a corresponding set of substantially fan shaped teeth provided on said pulley and a set of substantially fan shaped teeth on said housing.

4. An apparatus for manually rewinding a cassette as recited in claim 3 wherein said pulley has a flange extending integrally into a hub, said flange is provided with a recess having a flange recess back wall and said teeth provided on said pulley are formed integrally on said back wall of said recess.

5. An apparatus for manually rewinding a cassette as recited in claim 3 wherein said housing comprises a front plate, said plate is formed integrally with a recess having a plate recess back wall and said fan shaped teeth on said housing are formed integrally on said plate recess back wall.

6. An apparatus for manually rewinding a cassette as recited in claim 1 wherein said apparatus further comprises a pin adapted to be inserted in a second tape hub of said cassette such that said second hub rotates said pin and a braking block adapted to abut on said pin for frictionally restraining the rotation of said pin, so that said pin keeps said tape in tension during the rewinding operation, an adjustment screw abutting on said braking block and adapted to allow the user to adjust the friction of said braking block on said pin.

* * * * *